(12) United States Patent
Bunting

(10) Patent No.: US 8,500,996 B1
(45) Date of Patent: Aug. 6, 2013

(54) SELF SUSTAINING VEGETATED ROOF FOR HARVESTING AND RECYCLING RAIN WATER

(76) Inventor: Ryan Mitchell Bunting, Milton, DE (US)

( * ) Notice: Subject to any disclaimer, the term of this patent is extended or adjusted under 35 U.S.C. 154(b) by 236 days.

(21) Appl. No.: 12/927,498

(22) Filed: Nov. 16, 2010

(51) Int. Cl.
*C02F 3/32* (2006.01)

(52) U.S. Cl.
CPC ......................................... *C02F 3/32* (2013.01)
USPC ................. 210/151; 210/170.03; 210/170.08; 210/602

(58) Field of Classification Search
USPC .......... 210/150, 151, 170.01, 170.03, 170.08, 210/602
See application file for complete search history.

(56) References Cited

U.S. PATENT DOCUMENTS

| | | | | |
|---|---|---|---|---|
| 5,192,426 A * | 3/1993 | DeCoster et al. | ........ | 210/170.07 |
| 5,733,453 A * | 3/1998 | DeBusk | .................... | 210/170.08 |
| 6,277,274 B1 * | 8/2001 | Coffman | ....................... | 210/150 |
| 6,887,375 B2 * | 5/2005 | Johnson | .................... | 210/170.03 |
| 2003/0217954 A1 * | 11/2003 | Towndrow | ..................... | 210/170 |
| 2006/0070299 A1 * | 4/2006 | Furumura et al. | ................ | 47/69 |
| 2007/0094927 A1 * | 5/2007 | Perry | ............................. | 47/65.9 |
| 2007/0256966 A1 * | 11/2007 | Siviter et al. | ................... | 210/150 |
| 2008/0179240 A1 * | 7/2008 | Kauppi et al. | ................. | 210/602 |
| 2010/0051540 A1 * | 3/2010 | Wanielista et al. | ....... | 210/170.03 |
| 2010/0058657 A1 * | 3/2010 | Fishburn | ......................... | 52/102 |

* cited by examiner

Primary Examiner — Christopher Upton
(74) *Attorney, Agent, or Firm* — Jeffrey R. Ramberg

(57) ABSTRACT

Broadly, an exemplary embodiment of the present invention provides a self sustaining green vegetated roof for harvesting and recycling rain water, including a re-created wetland disposed to harvest rain water, the re-created wetland supported on top of a combination of pervious and impervious layers of materials configured on a top surface of a roof of a building; a water filtration system disposed to mimic a natural wetland ecosystem; and a storage system disposed to collect water from the filtration system to be made available for use.

23 Claims, 4 Drawing Sheets

US 8,500,996 B1

SELF SUSTAINING VEGETATED ROOF FOR HARVESTING AND RECYCLING RAIN WATER

CROSS-REFERENCE TO RELATED APPLICATIONS

This patent document claims the benefit of commonly owned U.S. Provisional Patent Application No. 61/260,891, filed on Nov. 13, 2009, in the name of Ryan Bunting and entitled "SELF SUSTAINING VEGETATED ROOF FOR HARVESTING AND RECYCLING RAIN WATER".

BACKGROUND OF THE INVENTION

1. Field of the Invention

The present invention relates to vegetated roofs and to recycling of rain water.

2. Discussion of Related Art

A prior art search revealed the following patents as possibly being relevant to the instant invention: U.S. Patent Application Publication Nos. 2002/0007591 and 2007/0094927.

The conversion of vegetated areas to roads and buildings, e.g., development, has a number of adverse impacts, which are particularly noticeable as development density increases. For example, transevaporation is the natural cooling effect that occurs as water, deriving from rainfall, for example, evaporates back into the atmosphere. Development reduces this cooling effect because rain falling on a building or road is quickly funneled into storm sewers. Further, the substitution of darkly colored roads and roofs for the vegetation absorbs heat, and these two phenomena contribute to the so-called "heat island" effect. This effect is more pronounced in summer than in winter, just when it is not wanted, because the sun is higher in the sky. As a result, the cooling requirements for a building subject to the heat island effect are greater than they would be otherwise, resulting in greater operating costs and the possible generation of greenhouse gases associated with the requirements for the generation of the additional electricity to cool the building.

Another problem, particularly noticeable with high density development, is water consumption. Water for drinking, that is "potable" water, is only a small fraction of the total amount consumed by a person in a developed country. Other non-drinking uses include bathing, washing clothes, dishes and cars. These other uses do not require that the water be potable; that is, the water can be so-called "gray" water. Nevertheless, most people get their water from a well or from a municipal water company, the entire quantity of which typically is potable.

The advent of so-called "vegetated roofs" has a number of benefits, such as reducing the heat island effect, and possibly providing food and an aesthetically pleasing view. However, up to now there has been no effort to store the excess rainfall not used by the vegetation of the vegetated roof. Further, during drought periods, unless the vegetation can be allowed to die or to go dormant, it will need to be watered with fresh water, usually deriving from a municipal water system, which often derives from underground aquifers. In many areas, heavy reliance on the aquifer as a source of domestic use water is noticeably, and in some cases, severely depleting the aquifer.

The instant invention is intended to address these problems.

SUMMARY OF THE INVENTION

Broadly, an exemplary embodiment of the present invention provides a self sustaining green vegetated roof for harvesting and recycling rain water, including a re-created wetland disposed to harvest rain water, the re-created wetland supported on top of a combination of pervious and impervious layers of materials configured on a top surface of a roof of a building; a water filtration system disposed to mimic a natural wetland ecosystem; and a storage system disposed to collect water from the filtration system to be made available for use.

DETAILED DESCRIPTION OF THE INVENTION

Figure 1:
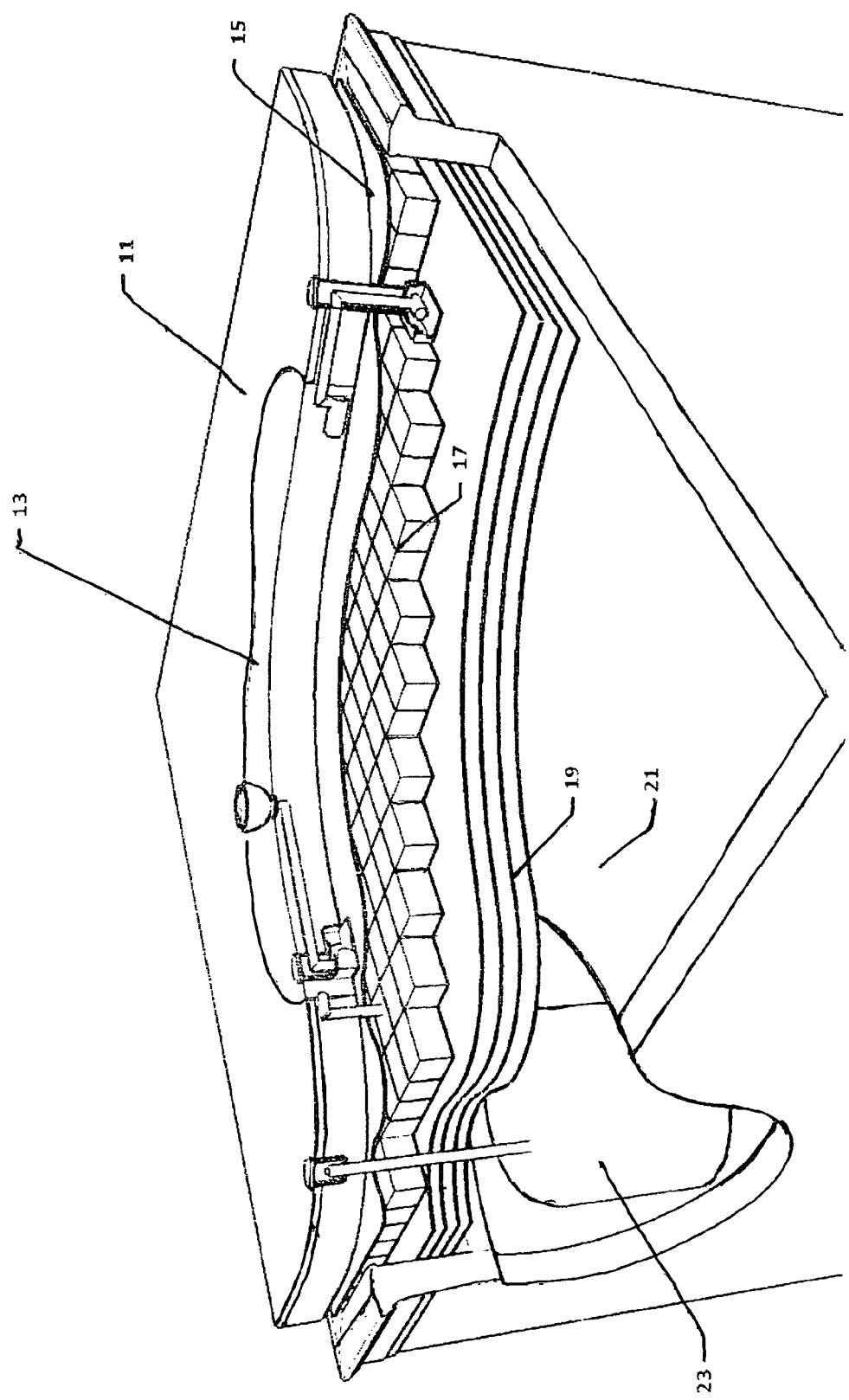
FIG. 1 shows an overview in perspective of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an exemplary embodiment of the present invention provides a self sustaining green vegetated roof for harvesting and recycling rain water, including a re-created wetland disposed to harvest rain water, the re-created wetland supported on top of a combination of pervious and impervious layers of materials configured on a top surface of a roof of a building; a water filtration system disposed to mimic a natural wetland ecosystem; and a storage system disposed to collect water from the filtration system to be made available for use.

Rain water as well as condensation from HVAC or refrigeration units can be harvested, filtered through a natural process (described in more detail below) and reused in gray water situations such as toilet flushing, industrial washing, irrigation or an extra water source for firefighting. Having the water stored on the roof harnesses the power of gravity, reducing the amount of power needed to move the water to its required demands on lower floors.

The water is filtered through a man-made wetland filtration system above the storage unit; that is, the filtration system is made to mimic the water filtering action of a natural wetlands ecosystem. The water can be readily available for gray water usage and gravity aides in the movement of the water, reducing energy requirements by not requiring large pumps. If desired, the design can be altered to achieve minimum potential by subtracting the gray water re-usage goals. It could also have added mechanical filtration to allow the water to be used for drinking water or other potable water uses.

This system harvests all the rain water and condensation that would fall on the roof. After it is harvested it is filtered through the wetland filtration system; this water is constantly re-circulating, increasing filtration. The wetlands system design incorporated with terrestrial (e.g., non-hydroponic) plantings covers the roof with vegetation, making this a "Green Roof", which multiplies the environmental benefits of the present invention, which can be called an "Aqua Green Roof" system.

The wetland filtration system features several components that work together, filter, circulate and distribute the water to the vegetated roof to maximize the evapotranspiration. The wetland filtration system and the vegetated roof are located above the water containment system. The two systems are separated by a root barrier and drainage system layered on top of the water containment area and up the building sidewalls. This barrier is here to:

Separate and contain the growing media and sediment from falling into the water containment area Prevent root structures from growing into the water containment area and beyond Allow water to pass through to the water containment area during heavy rainfall.

The barrier can be made of a substance called a "geo-textile fabric", which is a woven fabric available from a number of manufacturers.

The area occupied by the wetland filtration system features a EPDM (ethylene propylene diene monomer) water-impermeable liner to contain an area for filtration. The required dimensions of that area are determined by the amount of rainfall to be harvested and filtered. This area will feature a pump located in a pump vault to circulate the water through the water containment area. By continually moving the water, stagnation is avoided, and filtration is maintained. A separate vault located in the water containment area will house another pump to continuously feed this area with new water to filter. The filter is comprised of bio-balls (a biological filter media) and a top dressing of natural stone gravel. The material of this filter is designed to create maximum surface area for beneficial bacteria to colonize and filter nutrients out of water. They are made out of plastic, which cuts down on weight. This is a substitute for natural stone gravel. The thin gravel layer on top is for aesthetic value more than surface area gain; it is also the layer in which the marginal aquatic plants will be planted. There will be different species of aquatic marginal plants in this area to aid in removal of nutrients and pollutants from the water. This area can be incorporated with overflow systems that can irrigate the terrestrial vegetated areas. Irrigation methods will vary with a number of factors, including:

1. Size of vegetated roof
2. Depth and characteristics of planting media
3. Water demand of vegetation
4. Amount of annual rainfall available and amount to be harvested
5. Local climate and evaporation rate
6. Cost and method efficiency rate.

Most methods will likely be subsoil level methods, particularly where rainfall is scarce and evaporation rate is high. Some situations could allow above-soil irrigation methods, such as where rainfall is plentiful and evaporation rate is low.

The terrestrial vegetated roof aspect will vary based upon several factors:

1. Design intentions and goals to be achieved by green roof system
2. Local climate and annual rainfall
3. Estimated annual gray water consumption
4. A design not using gray water possibilities, thereby allowing all water harvested to be used for roof consumption.

The terrestrial areas will have slightly graded slopes leading to drains that flow directly into the containment area for high volume rain event drainage. Some locations are more subject to these types of rainfalls; thus, the number of drains will be determined by local rainfall history.

The water containment area is located beneath the drainage/root barrier layer. This area features a storm water containment product called a water tank, water storage vault, or rain tank. These are box structures that have an immense crush load and have the cubic volume to contain water. This area is designed based upon several factors:

1. Size of proposed dwelling area
2. Annual rainfall history on the proposed dwelling area
3. Amount of water required by vegetated roof
4. Estimated amount of gray water usage desired
5. Cost constraints In general, as the first four factors go up, the required water containment area goes up.

Below the rain tanks is another layer of geo-textile fabric to protect the impervious membrane roofing system below it. The membrane roofing system could be made of EPDM liner already in use for roofing products. Polypropylene liners can and are being used for this purpose as well. Still further, there are paint-on rubber membrane systems. The overall purpose of this layer is to contain the entire projects' water. This liner goes over the entire roof structure and up the parapet walls, the (at least) waist-high side walls at the perimeter of the roof. This liner protects the building structure from the water that is harvested and contained. Below this liner is another layer of geo-textile fabric to protect the membrane liner from the solid building materials and the pressure of the weight upon it.

The gray water storage tank can be located a floor below the roof or can be designed to be on the roof level. This tank could have mechanical filtration added to bring the water to potable water standards. This tank is separate from the rain tanks, as many building codes require that.

The Aqua Green Roof system is designed to be a zero run-off system. If for some reason the system cannot be designed to achieve this goal, the design will then be modified to incorporate an over flow system that is arranged to connect either with local storm water management or to a separate harvesting basin on the ground. Such overflow basin would contain water that could be used at ground level. If the water cannot be re-used for anything, the basin would then become a deep ground infiltrating drain so that the water can re-enter and help recharge the aquifer, thus, completing the hydrologic cycle.

The invention will now be further described with reference to the drawings. The following is a list of the parts or components referenced in the drawings. Like numbers refer to like components.

11 bio growth/planting area
13 gravel/filter ball media
15 geo-textile fabric
17 water storage vaults
19 multi-layer geo-textile fabric
21 membrane roofing system
23 gray water harvesting system
25 access vault
27 pump
29 flexible PVC pipe
31 output filter module
33 water aeration feature
35 water re-entry pipe
37 overflow injection pipe
39 aeration pump FIG. 1 shows an overview of an embodiment of the present invention. Here, membrane roofing system 21 forms a water-impermeable barrier between the habitable portions of the building or structure and the vegetated roof. The gray water harvesting system 23 is located below the membrane roofing system 21. On top of the membrane roofing system 21 is the multi-layer geo-textile fabric 19, whose main purpose is to act as an "armor" to prevent piercings or punctures of the membrane roofing system by components lying above it. The water storage vaults 17 lie on top of the multi-layer geo-textile fabric. Another layer of the geo-textile fabric 15 separates the water storage vaults 17 from the vegetation, and in particular, acts as a root barrier. On top of the geo-textile fabric 15 lies the gravel and/or bio-ball biological filter media 13, and on top of this is placed the vegetation, e.g., trees, shrubs, grasses, flowers, fruits and/or vegetables. In selected areas, however, there is no vegetation, except possibly for aquatic plants, i.e., no terrestrial vegetation. Instead, this region between the geo-textile fabric and the air is the "wetland filtration system" featuring the gravel and/or bio-ball biological filter media. Substantial water may lie or be pumped into this region, so it is lined with impermeable material such as plastic or rubber sheeting.

In operation, precipitation falls on the roof surface, including those areas featuring the vegetation layer. As the vegetated area becomes saturated with precipitation, the excess begins to leach through the geo-textile fabric and into the water containment area, e.g., the water storage vaults. If the water storage vaults are filled, or become filled, excess precipitation is funneled or pumped into the gray water harvesting system, e.g., tank, for use in the building.

The water collected in the water storage vaults is kept moving by pumping it back up above the geo-textile fabric to the wetland filtration system, and specifically, to the biological filter media layer. This circulation is constant or continual. In another mode, the "irrigation" mode, the water is pumped above the surface of the vegetation, and makes its way (e.g., is poured or sprayed) onto the vegetation ("aeration").

The system can be run by a computer program that controls irrigation and gray water use. This program is customizable for local weather patterns and weather events. This system can also be remotely controlled via wireless internet.

Figure 2:
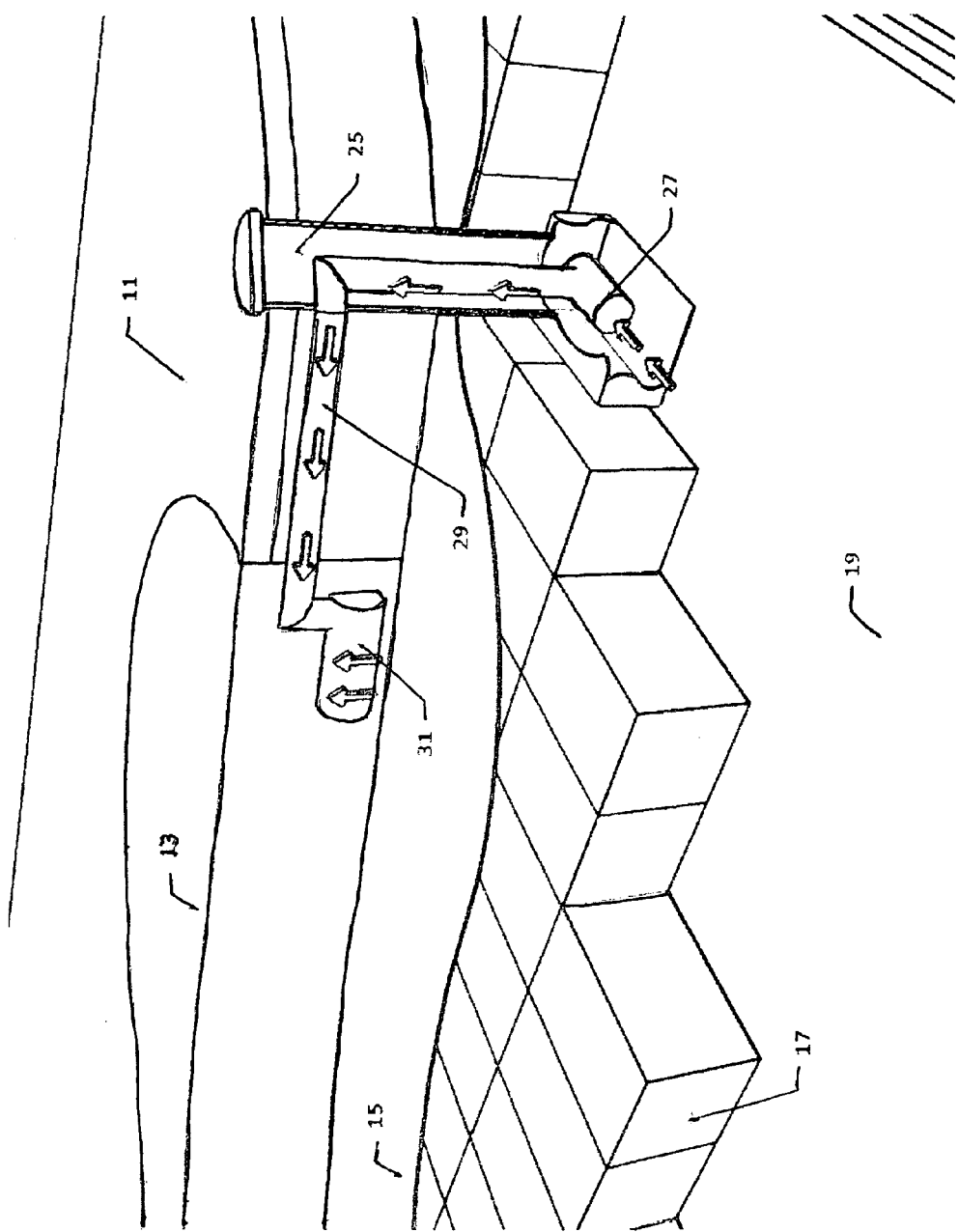
FIG. 2 shows a detail perspective view of the wetlands pumping sub-system of an exemplary embodiment of the present invention.

Referring now to FIG. 2, what is shown is the mode by which harvested precipitation in the water containment area is pumped back up to the wetlands area and specifically to the biological filter media region so as to repeatedly filter the harvested rainwater. Upon activation, pumps 27 pumps water through flexible polyvinyl chloride (PVC) pipe 29 above geo-textile fabric layer 15 and out of output filter module 31, which resides in the biological filter media layer (e.g., bio-balls and/or gravel) at the bottom of the wetland filtration area. Access vault 25 is a structurally sound compartment that houses pumps and/or plumbing. It provides easy access to these components, for example, for inspections or service.

Figure 3:
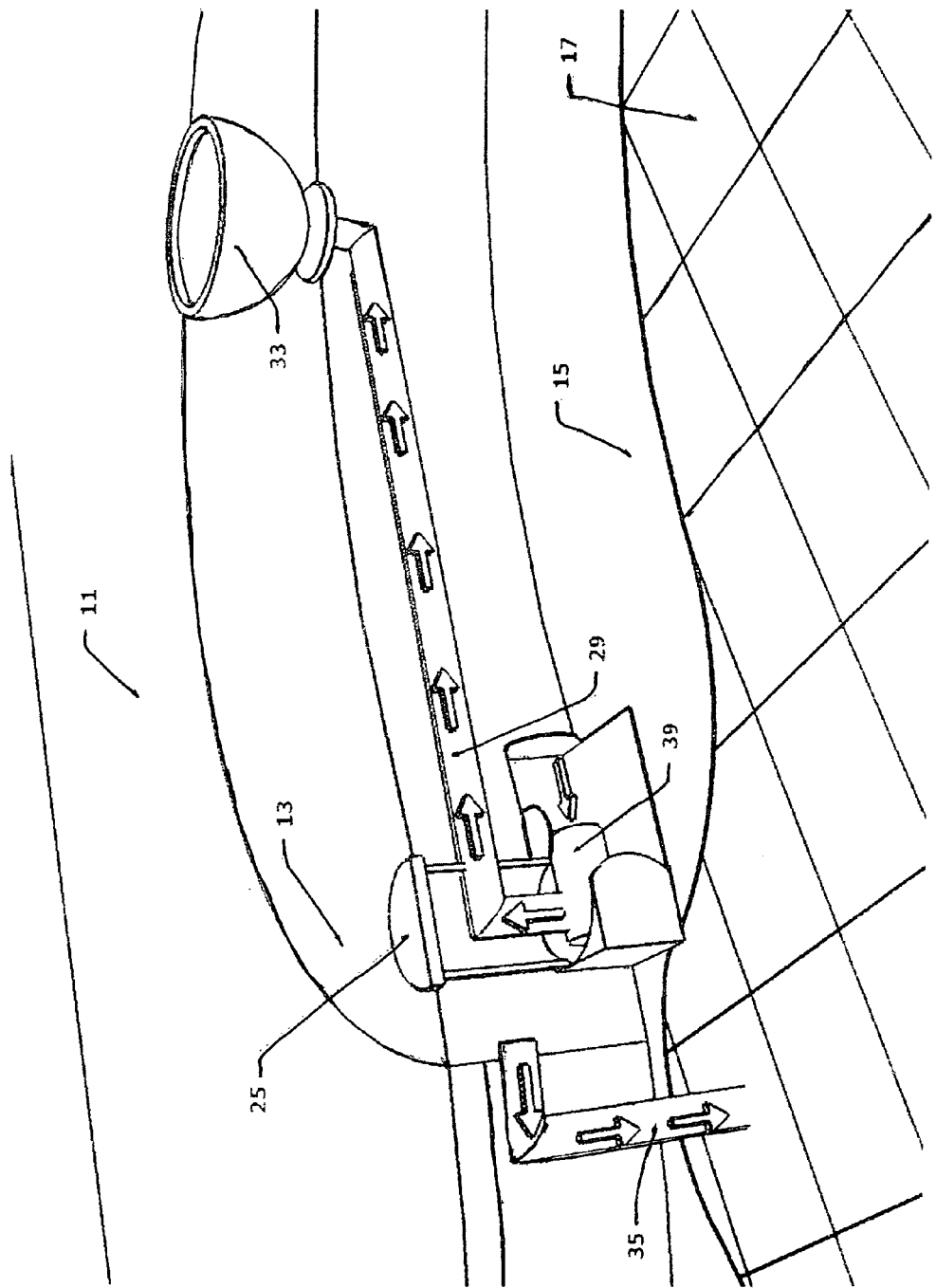
FIG. 3 shows a detail perspective view of the aeration or irrigation pumping sub-system of an exemplary embodiment of the present invention.

Referring now to FIG. 3, what is shown is the mode by which harvested precipitation in the water containment area is pumped back up to provide aeration or irrigation to the vegetation or planting area. Specifically, aeration pump 39 here is located in the wetland region, for example, at the bottom of the wetlands filtration area. Thus, it pumps water from this wetlands region through flexible PVC pipe 29 and out of water aeration feature 33 in a "waterfall" or cascading fashion and onto the vegetation of the vegetated roof. Water aeration pump 39 is distant from output filter module 31, for example, it may be located on an opposite end of the wetland area. Since the wetlands filtration area is isolated from the other regions of the overall system by the water-impermeable layer or fabric (not shown), water re-entry pipe 35 is provided for the purpose of moving water from this wetlands regions, e.g., filtered water, to the water containment area. The pump 27 from the water containment area, e.g., water storage vaults, continually fills the wetland filtration area with new water to be filtered. The re-entry pipe keeps the water flowing back into the containment area after it has been circulated through the wetlands filtration system. Thus, these components and actions define a cycle, and water continually flows from the containment area through the wetland area and back to the containment area (e.g., via re-entry pipe 35).

Figure 4:
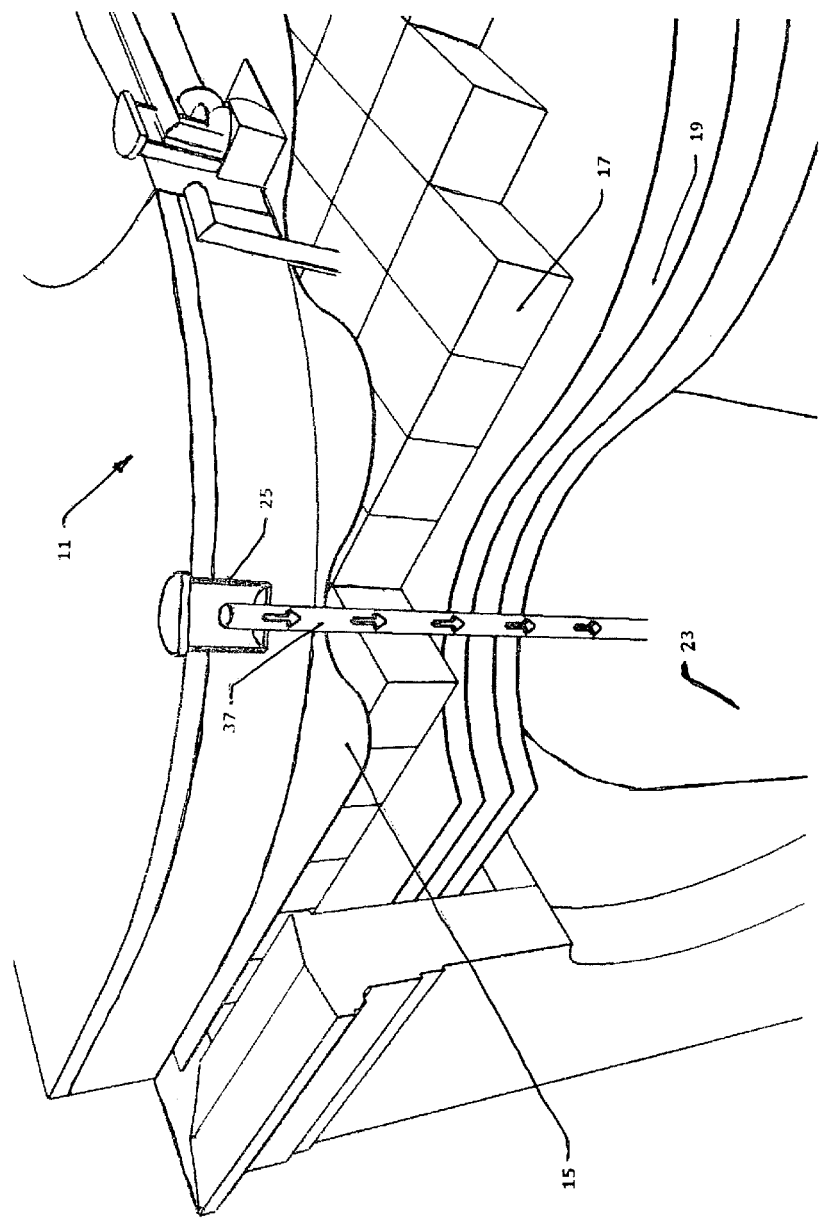
FIG. 4 shows a detail perspective view of the gray water harvesting sub-system of an exemplary embodiment of the present invention.

Referring now to FIG. 4, what is shown in cut-away is gray water harvesting system 23 in fluid communication with the bio growth/planting area 11 via overflow injection pipe 35. Specifically, if water storage vaults 17 are full and unable to hold any more precipitation, the excess water, rather than flooding the vegetation, and risking placing excessive loads on the roof of the building, flows into the overflow injection pipe 35, which dumps into the tank of the gray water harvesting system 37. Once in this tank 37, the water will be used for gray water applications in or near the building, such as washing clothes or cars, and will no longer be pumped back onto the vegetated roof for watering vegetation. Tank 37 may also be supplied by water containment area pump 27.

The present invention helps solve many environmental problems caused by residential and commercial building, such as storm water management that leads to but is not limited to destruction of natural wetlands and watershed ecosystems. If used in large practice in city environments, the present invention can have an effect on air quality and micro climatology.

The following permutations are intended to be included in the scope of the invention:

Option "A"

Water is collected from a pitched roof, wherein the water flows through the pitched biolayer into collection gutters and is distributed onto a flat biolayer. Water is then collected through the flat biolayer in accordance with the design illustrated in FIGS. 1-4.

Option "B"

Water is collected from a pitched roof, wherein the water flows through the pitched biolayer into collection gutters and is distributed to water collection vaults in a remote location. It is then reprocessed via a pumping system for redistribution to the biolayer on the pitched roof.

Option "C"

Water is collected from a flat biolayer located in a patio area. The water is then distributed to water collection vaults in a remote location, and is reprocessed via a pumping system for redistribution to the biolayer in the patio area and to a biolayer on a pitched roof.

It should be understood, of course, that the foregoing relates to exemplary embodiments of the invention and that modifications may be made without departing from the spirit and scope of the invention as set forth in the following claims.

What is claimed is:

1. A self sustaining roof for harvesting and recycling rain water, comprising:
   a water filtration system disposed to mimic a natural wetland ecosystem, said water filtration system lined with at least one water-impervious layer of material disposed on a top surface of a roof of a building, thereby defining a wetland filtration area; and
   a water containment area located directly beneath said water filtration system and disposed within a footprint of the building to collect water from the water filtration system to be made available for use;
   a means for pumping water from said water containment area up to and into said wetland filtration area; and
   a water re-entry pipe for moving water from said wetland filtration area to said water containment area.

2. The self-sustaining roof of claim 1, further comprising at least one water-impermeable layer placed beneath said water containment area.

3. The self-sustaining roof of claim 2, wherein the building comprises at least one wall defining a perimeter of said footprint, and further wherein said water-impermeable layer beneath said water containment area extends at least waist high up the perimeter-defining wall of the building.

4. The self-sustaining roof of claim 1, further comprising at least one water-pervious layer placed between said wetland filtration area and said water containment area.

5. A vegetated roof system for harvesting and recycling rain water, comprising:
   a layer comprising a first area comprising vegetation and a second area comprising a wetland filtration system, said layer disposed on a top surface of a roof of a building to harvest at least a portion of rain water that impinges on said layer;
said wetland filtration system arranged to filter excess rain water not used by said vegetation;
   a water containment area disposed to collect water from the layer, said collected water to be made available for use;
   a water-pervious fabric disposed between said vegetation area and said water containment area such that excess water leaches from the vegetation area into said water containment area through said water-pervious fabric;
   a means for pumping water from said water containment area up to and into said wetland filtration system area; and
   a means for moving water from said wetland filtration system area to said water containment area;
   wherein said wetland filtration system area is separated from other regions of said vegetated roof system by a water-impervious layer of material.

6. The vegetated roof system of claim 5, further comprising a biological filter media located between said layer of vegetation and said water-pervious fabric.

7. The vegetated roof system of claim 6, wherein said wetland filtration system comprises bio-balls.

8. The vegetated roof system of claim 6, wherein said wetland filtration system further comprises gravel.

9. The vegetated roof system of claim 5, wherein said water containment area comprises a plurality of rain tanks.

10. The vegetated roof system of claim 5, wherein said water containment area further comprises a gray water storage tank.

11. The vegetated roof system of claim 10, wherein said gray water storage tank is located on a roof of a building, or one story below.

12. The vegetated roof system of claim 5, further comprising a second pump located in the wetlands filtration system area to pump water to the vegetation area.

13. The vegetated roof system of claim 5, further comprising an overflow system.

14. The vegetated roof system of claim 13, wherein said overflow system connects with local storm water management or to a separate harvesting basin on the ground.

15. The vegetated roof system of claim 14, wherein said harvesting basin is arranged to contain water that could be used at ground level.

16. The vegetated roof system of claim 14, wherein said harvesting basin is arranged to be a deep ground infiltrating drain so that the water can re-enter and help recharge an aquifer.

17. The vegetated roof system of claim 5, further comprising at least one water-impervious layer placed below said water containment area.

18. The vegetated roof system of claim 17, wherein said at least one water-impervious layer comprises at least one of polypropylene and EPDM material.

19. The vegetated roof system of claim 17, further comprising at least two water-pervious fabrics, and wherein said at least one water-impermeable layer is placed between said at least two water-pervious fabrics.

20. The vegetated roof system of claim 19, wherein at least one of said at least two water-pervious fabrics comprises geo-textile fabric.

21. A vegetated roof system for harvesting and recycling rain water, comprising:
   a layer comprising terrestrial vegetation disposed on a top surface of a roof of a building to harvest at least a portion of rain water that impinges on said layer;
   a water containment area disposed to collect water from the vegetation layer, said collected water to be made available for use;
   a water-pervious fabric disposed between said vegetation layer and said water containment area;
   a water filtration system arranged to filter excess rain water not used by said vegetation, said water filtration system located between said vegetation layer and said water-pervious fabric, whereby excess water leaches from the vegetation layer into said water containment area through said water-pervious fabric; and
   a means for pumping water from said water containment area up to and into said water filtration system.

22. The vegetated roof system of claim 21, further comprising an area where there is no layer of terrestrial vegetation located above said water filtration system.

23. The vegetated roof system of claim 21, wherein said water filtration system comprises at least one of gravel and bio-balls.

* * * * *